(12) United States Patent
Roberts et al.

(10) Patent No.: US 10,647,239 B2
(45) Date of Patent: May 12, 2020

(54) DOOR PROP ASSEMBLY

(71) Applicant: Global Vacuum Systems, Navasota, TX (US)

(72) Inventors: Landon Roberts, Navasota, TX (US); Leland Sutton, Jr., Navasota, TX (US)

( * ) Notice: Subject to any disclaimer, the term of this patent is extended or adjusted under 35 U.S.C. 154(b) by 0 days.

(21) Appl. No.: 15/901,880

(22) Filed: Feb. 21, 2018

(65) Prior Publication Data
US 2018/0236922 A1     Aug. 23, 2018

Related U.S. Application Data

(60) Provisional application No. 62/461,237, filed on Feb. 21, 2017.

(51) Int. Cl.
| | | |
|---|---|---|
| *B60P 1/26* | (2006.01) | |
| *E05C 17/20* | (2006.01) | |
| *B60J 5/10* | (2006.01) | |
| *B60P 3/22* | (2006.01) | |

(52) U.S. Cl.
CPC ............... *B60P 1/26* (2013.01); *E05C 17/20* (2013.01); *B60J 5/108* (2013.01); *B60P 3/2245* (2013.01)

(58) Field of Classification Search
CPC .... B60P 1/26; B60P 1/16; B60P 1/267; B60P 1/165; B60P 1/28; B60P 1/38; B60P 1/483; E05C 17/365; E05C 19/10; E05C 3/34
USPC ... 298/23 R, 1 R, 7, 38, 22 R, 23 MD, 23 D, 298/25, 27, 30, 6; 414/425, 519, 528, 414/414, 424, 713, 705
See application file for complete search history.

(56) References Cited

U.S. PATENT DOCUMENTS

| | | | | |
|---|---|---|---|---|
| 5,407,390 A | * | 4/1995 | Carney ................ | A01D 46/082 298/1 B |
| 5,516,135 A | * | 5/1996 | Christenson ........... | B62D 61/12 180/24.02 |
| 6,752,467 B1 | * | 6/2004 | Palrose .................... | B60P 1/34 298/11 |
| 8,414,083 B2 | * | 4/2013 | Dunker .................... | B60P 1/26 296/56 |
| 2002/0000748 A1 | * | 1/2002 | Fuller ................... | B60P 3/2245 298/17 R |
| 2002/0182043 A1 | * | 12/2002 | Anderson ............... | B65F 3/001 414/469 |
| 2015/0274057 A1 | * | 10/2015 | Hinde ..................... | B60P 1/162 298/22 R |

* cited by examiner

*Primary Examiner* — D Glenn Dayoan
*Assistant Examiner* — Sunsurraye Westbrook
(74) *Attorney, Agent, or Firm* — Shannon Warren

(57) ABSTRACT

A door prop assembly for selectively supporting a rear gate of a tilting vehicle. Said door prop assembly is configured to selectively prop said rear gate in an open configuration and safely release said rear gate to transition to a closed configuration. Said door prop assembly comprises a prop arm assembly, a lock bar assembly, a distal mount assembly, and a rotating lock arm. Said distal mount assembly is attached to a side portion of said rear gate. Said lock bar assembly is attached to a side portion of a tilting body. Said prop arm assembly comprises a substantially straight element being adapted to slide through portions of a lock bar of said lock bar assembly. Said rotating lock arm is configured to rotate freely on a locking hook hinge. A side plates at a distal hinge is configured to rotate freely relative to said distal mount assembly.

18 Claims, 14 Drawing Sheets

SECTION A-A

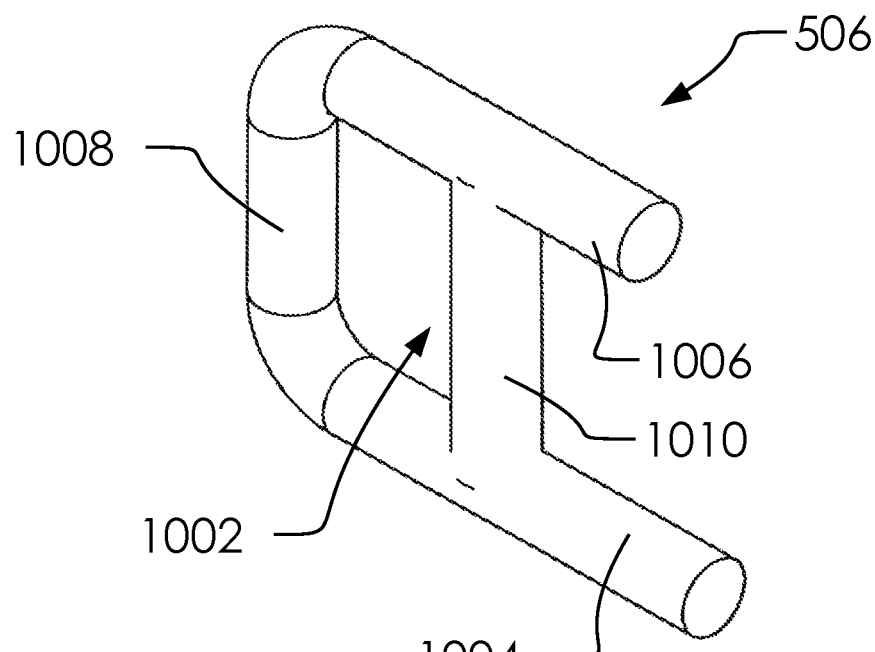
FIG. 10A
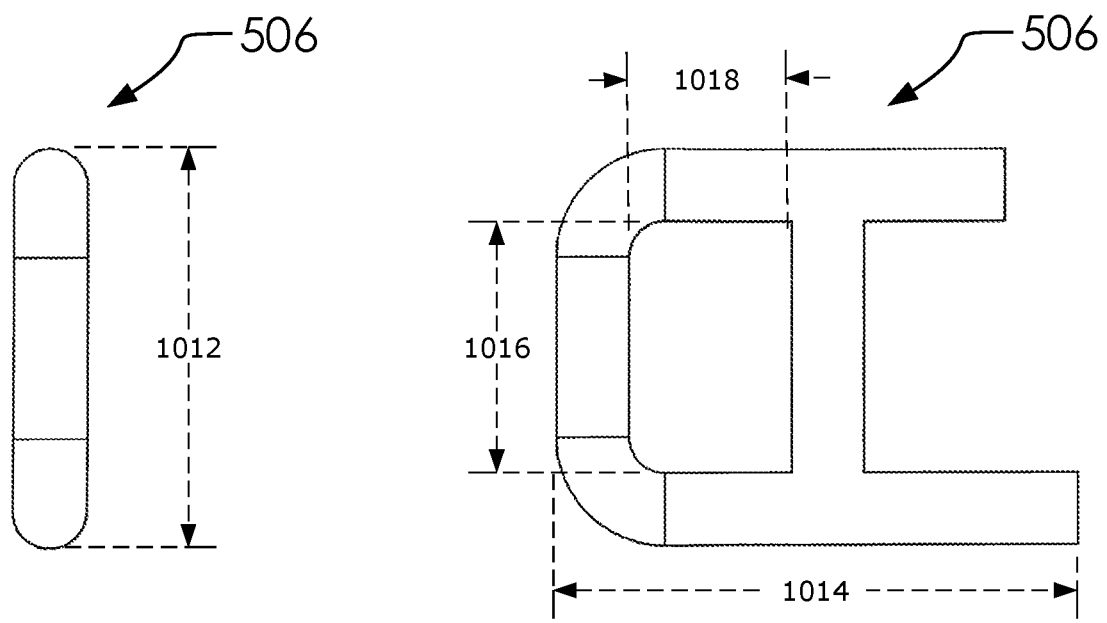
FIG. 10B
FIG. 10C

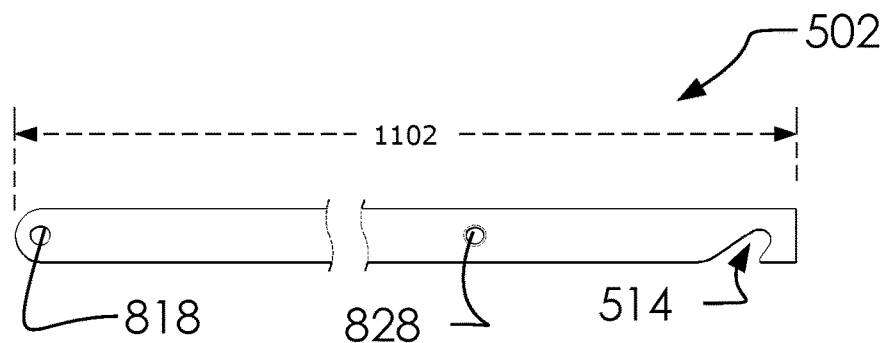
FIG. 11A  FIG. 11B
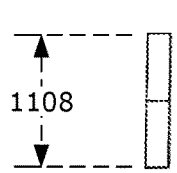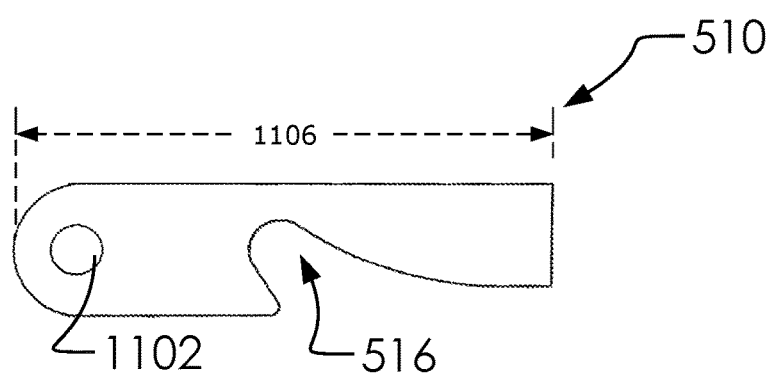
FIG. 11C  FIG. 11D
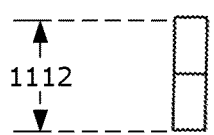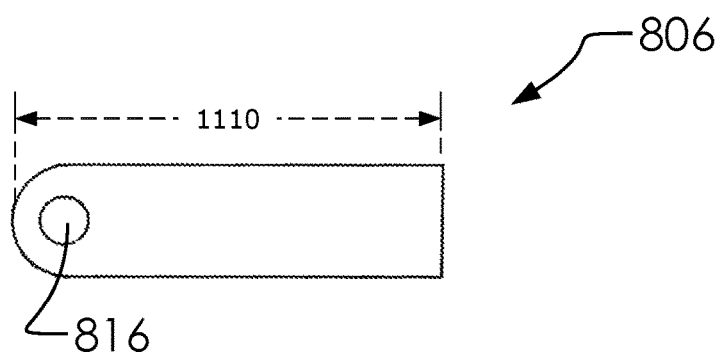
FIG. 11E  FIG. 11F

808

830

810

1200

DOOR PROP ASSEMBLY

CROSS-REFERENCE TO RELATED APPLICATIONS

This application claims benefit to U.S. Patent Application No. 62/461,237 filed on Feb. 21, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant

None of the known inventions and patents, taken either singularly or in combination, is seen to describe the instant disclosure as claimed.

BRIEF SUMMARY OF THE INVENTION

A door prop assembly for selectively supporting a rear gate of a tilting vehicle. Said door prop assembly is configured to selectively prop said rear gate in an open configuration and safely release said rear gate to transition to a closed configuration. Said door prop assembly comprises a prop arm assembly, a lock bar assembly, a distal mount assembly, and a rotating lock arm. Said distal mount assembly is attached to a side portion of said rear gate. Said lock bar assembly is attached to a side portion of a tilting body. Said prop arm assembly comprises a substantially straight element being adapted to slide through portions of a lock bar of said lock bar assembly. Said rotating lock arm is configured to rotate freely on a locking hook hinge. A side plates at a distal hinge is configured to rotate freely relative to said distal mount assembly. Said rotating lock arm can rotate so as to slide through said lock bar as said door prop assembly transitions from a closed configuration and an open and locked configuration. Said door prop assembly is configured to rotate be transitioned back to said closed configuration by rotating said rear gate still further from said tilting body so as to pass the remaining portions of said rotating lock arm through said lock bar, catching a proximal locking hook on said lock bar with said door prop assembly at a fully extended configuration. Stopping rotation of said rear gate with said proximal locking hook, reversing rotating direction, and pressing said rotating lock arm through said lock bar in the opposite direction until said rear gate is closed and said door prop assembly is in said closed configuration.

A door prop assembly for selectively supporting a rear gate of a tilting vehicle. Said door prop assembly is configured to selectively prop said rear gate in an open configuration and safely release said rear gate to transition to a closed configuration. Said door prop assembly comprises a prop arm assembly, a lock bar assembly, a distal mount assembly, and a rotating lock arm. Said distal mount assembly is attached to a side portion of said rear gate. Said tilting vehicle comprises a trailer platform, a tilting body, a door hinge. Said tilting body being rotatably attached to said trailer platform. Said tilting body comprises said rear gate. Said rear gate is rotateably attached to said tilting body with said door hinge. Said lock bar assembly is attached to a side portion of said tilting body. Said prop arm assembly comprises a substantially straight element being adapted to slide through portions of a lock bar of said lock bar assembly. Said rotating lock arm is configured to rotate freely on a locking hook hinge. A side plates at a distal hinge is configured to rotate freely relative to said distal mount assembly. Said door prop assembly is configured to transition through a plurality of configurations with a closed configuration being closed and an open and locked configuration being engaged to support said rear gate.

A door prop assembly for selectively supporting a rear gate of a tilting vehicle. Said door prop assembly is configured to selectively prop said rear gate in an open configuration and safely release said rear gate to transition to a closed configuration. Said door prop assembly comprises a prop arm assembly, a lock bar assembly, a distal mount assembly, and a rotating lock arm. Said distal mount assembly is attached to a side portion of said rear gate. Said tilting vehicle comprises a trailer platform, a tilting body, a door hinge. Said tilting body being rotateably attached to said trailer platform. Said tilting body comprises said rear gate. Said rear gate is rotateably attached to said tilting body with said door hinge. Said lock bar assembly is attached to a side portion of said tilting body. Said prop arm assembly comprises a substantially straight element being adapted to slide through portions of a lock bar of said lock bar assembly. Said rotating lock arm is configured to rotate freely on a locking hook hinge. A side plates at a distal hinge is configured to rotate freely relative to said distal mount assembly. Said door prop assembly is configured to transition through a plurality of configurations with a closed configuration being closed and an open and locked configuration being engaged to support said rear gate. Said prop arm assembly comprises said side plates and a spacers. Said side plates comprises a first side plate, and a second side plate. Said spacers are configured to be pressed between said side plates and provide a space for said rotating lock arm. Said prop arm assembly comprises a first end, a second end and a midpoint. Said prop arm assembly is rotateably attached to said rear gate with said distal mount assembly and selectively rotate on said distal hinge. Said distal hinge is at said first end of said prop arm assembly. Said rotating lock arm is rotateably attached to said prop arm assembly and selectively rotates on said locking hook hinge. Said locking hook hinge is at said mid-point of said prop arm assembly. Said distal mount assembly attaches to said rear gate so as to allow said prop arm assembly and said rear gate to rotate relative to one another on said distal hinge. Said rotating lock arm selectively rotates relative to said prop arm assembly on said locking hook hinge. A spacer eye is welded between said side plates at said first end. A center spacers is welded between said side plates between said first end and said mid-point of said prop arm assembly. A distal spacer is welded between said side plates proximate to said second end. Said center spacers comprises a first center spacer, and a second center spacer. Said spacers comprises said center spacers, a proximal spacer, and said distal spacer. Said proximal spacer, said center spacers portions of said rotating lock arm, and said distal spacer can be pressed between said first side plate and said second side plate.

BRIEF DESCRIPTION OF THE SEVERAL VIEWS OF THE DRAWING

FIG. 10A illustrates a perspective overview view of lock bar 506.

FIG. 10B illustrates an elevated first side view of lock bar 506.

FIG. 10C illustrates an elevated front side view of lock bar 506.

FIG. 11A illustrates an elevated first side view of side plates 502.

FIG. 11B illustrates an elevated front side view of side plates 502.

FIG. 11C illustrates an elevated first side view of rotating lock arm 510.

FIG. 11D illustrates an elevated front side view of rotating lock arm 510.

FIG. 11E illustrates an elevated first side view of proximal spacer 806.

FIG. 11F illustrates an elevated front side view of proximal spacer 806.

DETAILED DESCRIPTION OF THE INVENTION

Figure 1A:
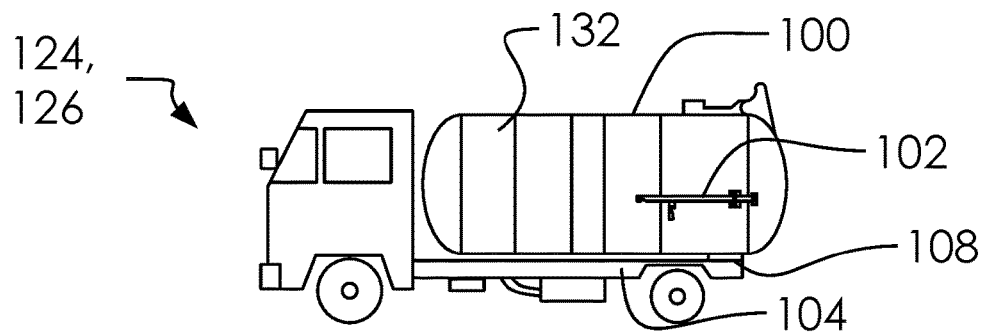
FIG. 1A illustrates an elevated front side view of vacuum truck 126.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:
- a trailer assembly 100
- a door prop assembly 102
- a trailer platform 104
- a tilting body 106
- a tilting hinge 108
- a door hinge 110
- a one or more latches 112
- a first side 116*a*
- a second side 116*b*
- a top 116*c*
- a bottom 116*d*
- a front portion 118
- a rear gate 120
- a locking arm hinge 122
- a tilting vehicle 124
- a vacuum truck 126
- a dump truck 128
- an open box bed 130
- a sealed vessel 132
- a plurality of configurations 206
- a closed configuration 206*a*
- a second configuration 206*b*
- a third configuration 206*c* an open and locked configuration 206d
a fully extended configuration 206e
a sixth configuration 206f
a prop arm assembly 500
a side plates 502
a first side plate 502a
a second side plate 502b
a lock bar assembly 504
a lock bar 506
a distal mount assembly 508
a rotating lock arm 510
a distal hinge 512
a proximal locking hook 514
a locking hook 516
a locking hook hinge 518
a first end 520
a second end 522
a mid-point 524
a spacers 800
a mounting bracket assembly 802
a proximal spacer 806
a center spacers 808
a first center spacer 808a
a second center spacer 808b
a distal spacer 810
a nut and bolt assembly 812
a washer 814
a spacer eye 816
a proximate plate eyes 818
a first proximate plate eye 818a
a second proximate plate eye 818b
a pipe 820
a bolt 822
a nut 824
a washers 826
a first washer 826a
a second washer 826b
a hook hinge eyes 828
a first hook hinge eye 828a
a second hook hinge eye 828b
a round bar 830
a lock bar eye 1002
a lower bar 1004
an upper bar 1006
a distal bar 1008
a proximate bar 1010
a length 1102
a width 1104
a length 1106
a width 1108
a length 1110
a width 1112
a lock arm eye 1114
a support plate 1200
a L-bracket 1302

FIG. 1A illustrates an elevated front side view of vacuum truck 126.

Figure 1B:
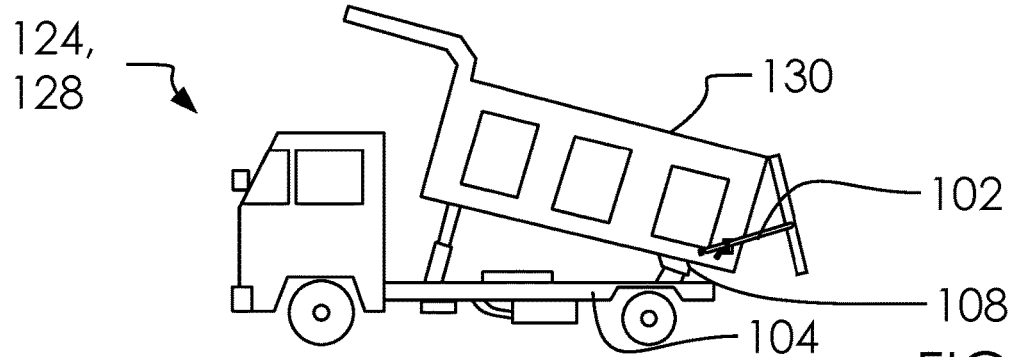
FIG. 1B illustrates an elevated front side view of vacuum truck 126.

FIG. 1B illustrates an elevated front side view of vacuum truck 126.

Figure 1C:
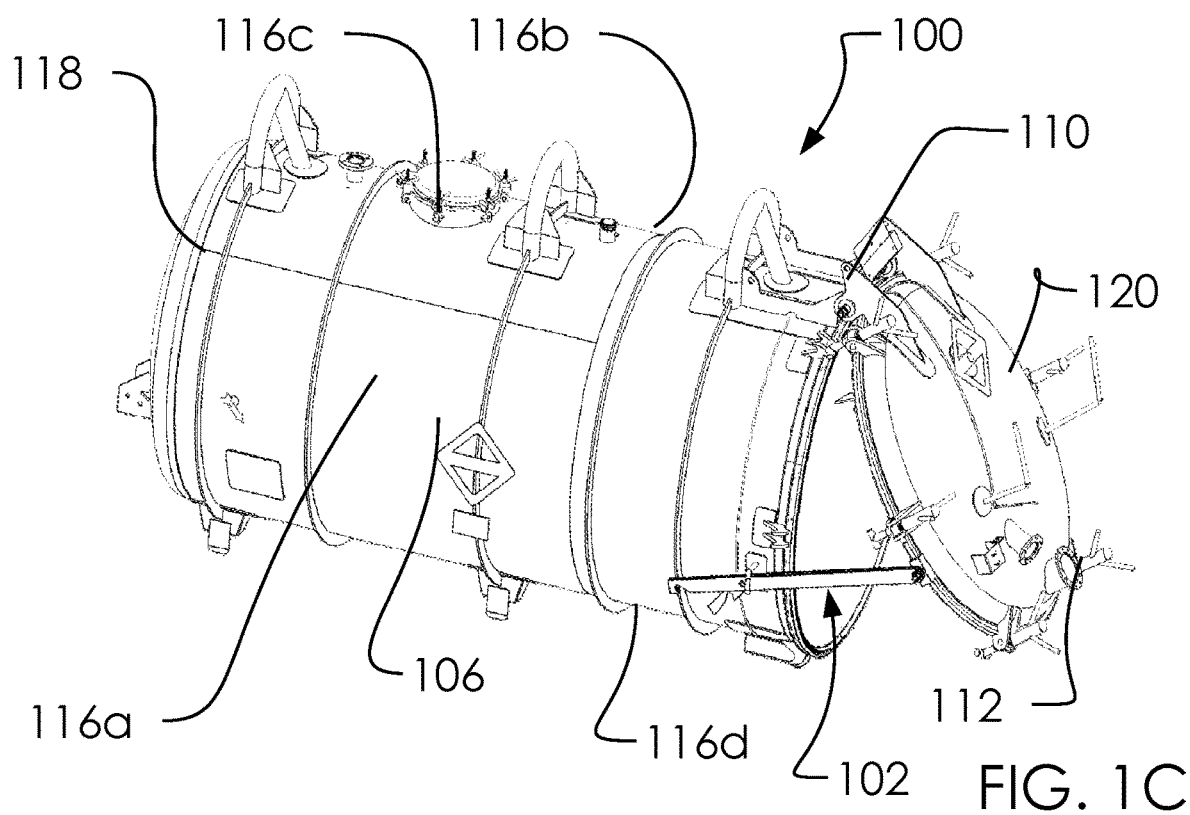
FIG. 1C illustrates a perspective overview view of trailer assembly 100.

FIG. 1C illustrates a perspective overview view of trailer assembly 100.

In one embodiment, said trailer assembly 100 can comprise said door prop assembly 102, said tilting body 106 and said tilting hinge 108.

In one embodiment, said tilting body 106 can comprise said door hinge 110, said one or more latches 112, said first side 116a, said second side 116b, said top 116c, said bottom 116d, said front portion 118 and said rear gate 120.

In one embodiment, said tilting vehicle 124 can comprise said trailer platform 104, said vacuum truck 126 and said dump truck 128.

In one embodiment, said dump truck 128 can comprise said open box bed 130 and said sealed vessel 132.

Said trailer assembly 100 can comprise a trailer portion of a tilting vehicle 124 (such as vacuum truck 126 and/or dump truck 128), as is known in the art.

As stated in the background section, said trailer assembly 100 can be applicable to other tilting trucks such as dump trucks, tip trucks or the like.

Said tilting body 106 can comprise said sealed vessel 132 being substantially sealed from the outer atmosphere, as is known in the art. In another embodiment, said tilting portion 106 can comprise said open box bed 130 as in the case of a dump truck.

In one embodiment, said rear gate 120 can comprise a door being selectively sealed to said tilting body 106 with said one or more latches 112. In one embodiment, said door hinge 110 can selectively rotate on said door hinge 110.

In one embodiment, said tilting body 106 can selectively rotate with respect to said trailer platform 104 on said tilting hinge 108.

In one embodiment, said door prop assembly 102 can be used to protect and support users of said trailer assembly 100. In one embodiment, said door prop assembly 102 can latch and hold said rear gate 120 open and minimize danger to the end user. In one embodiment, in the prior art, a user of tilting vehicle 124 often use a tension rod to hold said rear gate 120 open. Said door prop assembly 102 is a substantial improvement to the art and is designed for safety and simplicity of use.

Figure 2A:
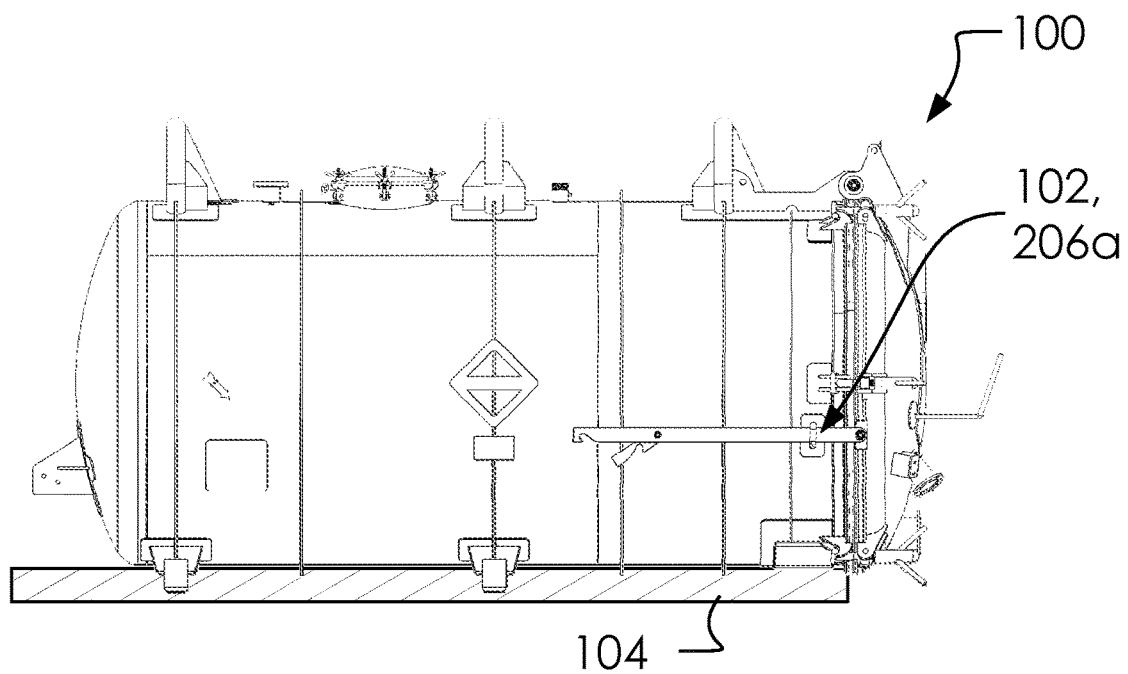
FIG. 2A illustrates an elevated front side view of closed configuration 206*a*.

FIG. 2A illustrates an elevated front side view of closed configuration 206a.

Figure 2B:
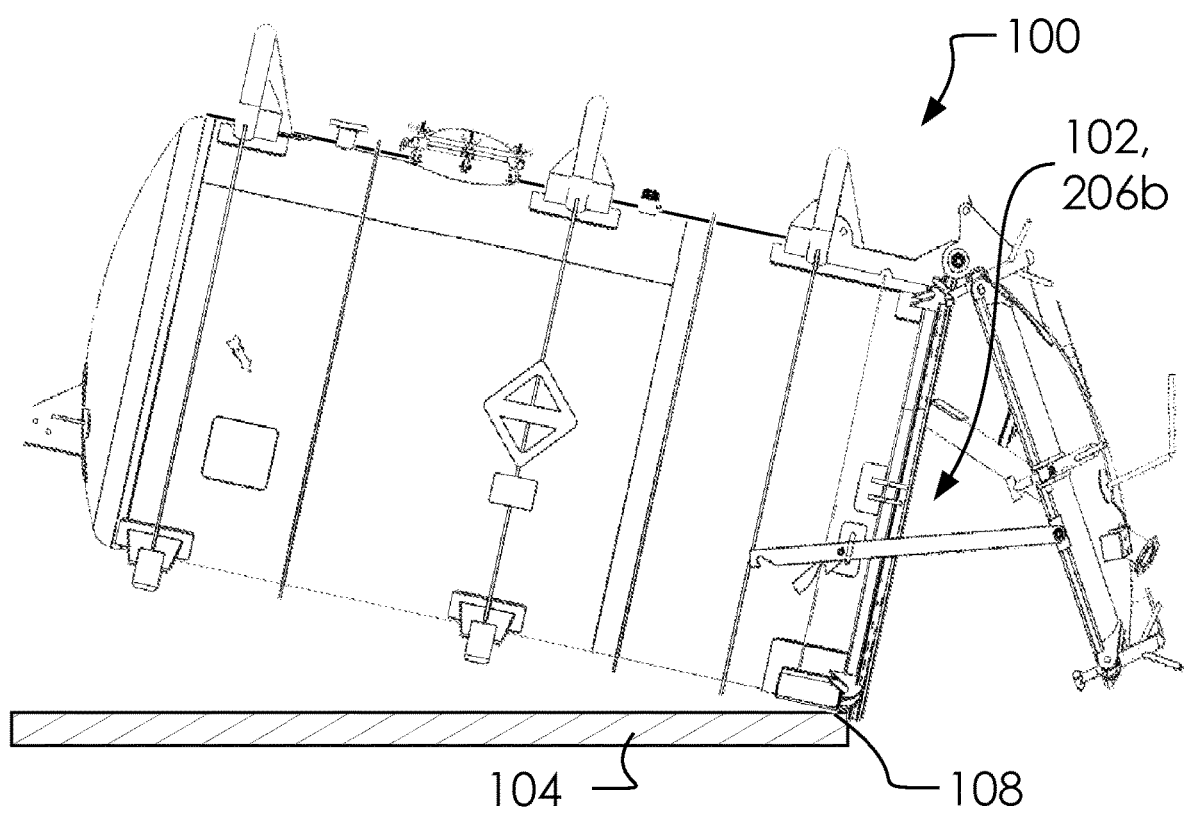
FIG. 2B illustrates an elevated front side view of second configuration 206*b*.

FIG. 2B illustrates an elevated front side view of second configuration 206b.

In one embodiment, said plurality of configurations 206 can comprise said closed configuration 206a, said second configuration 206b, said third configuration 206c, said open and locked configuration 206d, said fully extended configuration 206e and said sixth configuration 206f.

In one embodiment, said door prop assembly 102 can comprise said plurality of configurations 206.

In one embodiment, said tilting body 106 can tilt on said tilting hinge 108, as illustrated and as is known in the art.

In one embodiment, said plurality of configurations 206 can range from open (such as said open and locked configuration 206d), to closed (said closed configuration 206a) and transitional stages in between as illustrated herein.

In one embodiment, as said tilting body 106 tilts back on said tilting hinge 108, said rear gate 120 can open due to gravitational forces acting on said rear gate 120 and pulling on said door hinge 110. In one embodiment, said door prop assembly 102 can prevent said rear gate 120 from swinging on said door hinge 110 by selectively locking into said open and locked configuration 206d (illustrated below). In another embodiment, said rear gate 120 can be moved around said door hinge 110 by lifting systems, wherein, said door prop assembly 102 can hold said rear gate 120 in a safe position (such as said open and locked configuration 206d) without relying on gravitational forces for movement.

Figure 3:
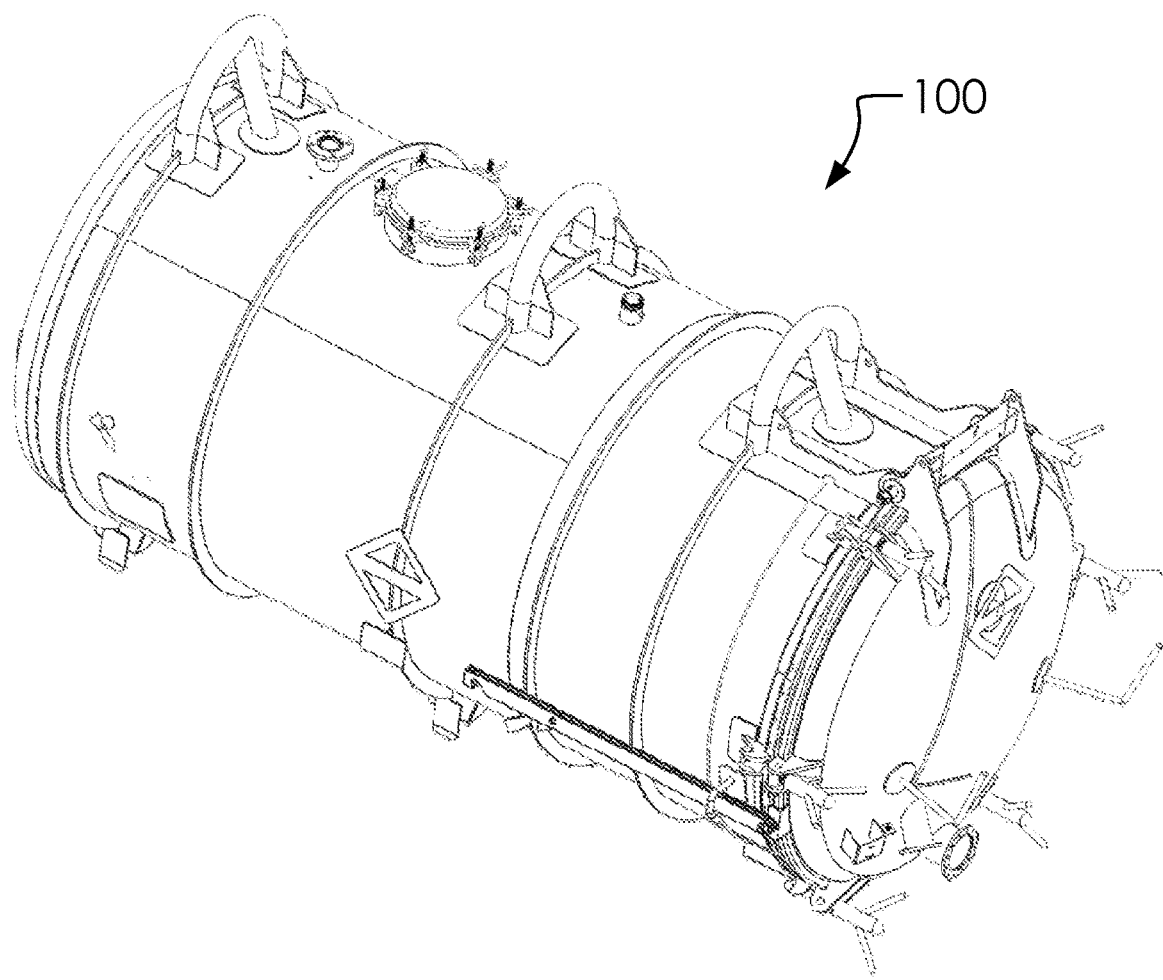
FIG. 3 illustrates a perspective overview view of trailer assembly 100.

FIG. 3 illustrates a perspective overview view of trailer assembly 100.

As illustrated, said door prop assembly 102 can attach to a side portion of said tilting body 106 and remain un obtrusive between uses.

Figure 4A:
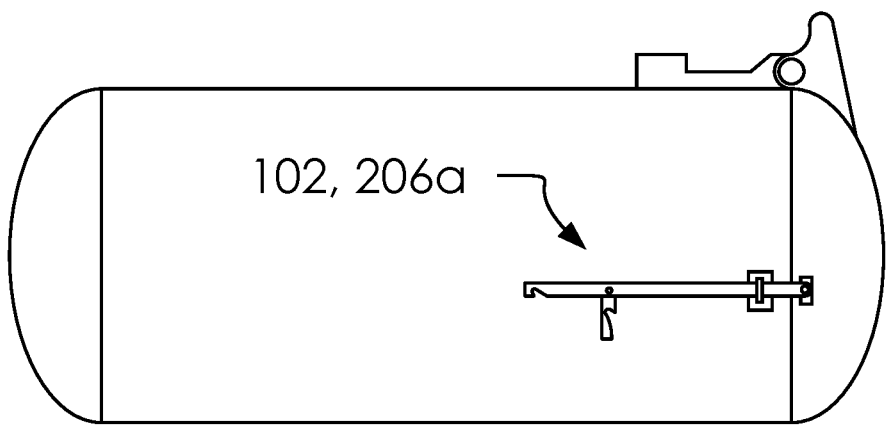
FIG. 4A illustrates an elevated front side view of closed configuration 206*a*.

FIG. 4A illustrates an elevated front side view of closed configuration 206*a*.

Figure 4B:
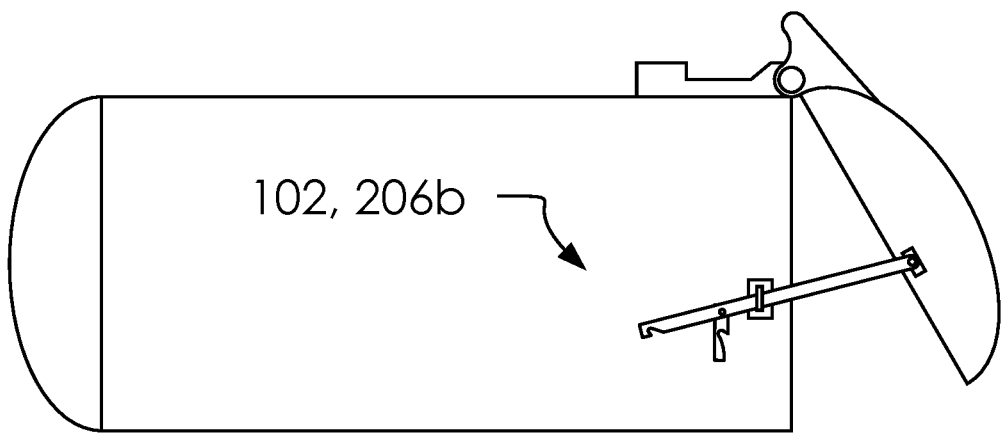
FIG. 4B illustrates an elevated front side view of second configuration 206*b*.

FIG. 4B illustrates an elevated front side view of second configuration 206*b*.

Figure 4C:
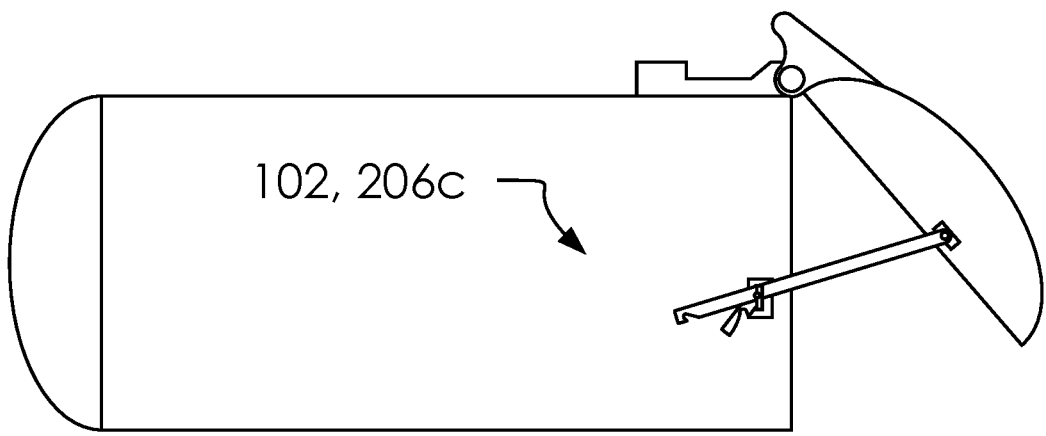
FIG. 4C illustrates an elevated front side view of third configuration 206*c*.

FIG. 4C illustrates an elevated front side view of third configuration 206*c*.

Said first configuration 206*a* can comprise said door prop assembly 102 in a closed position. Said second configuration 206*b* can comprise said rear gate 120 opening but not yet opened. Again, said third configuration 206*c* can comprise said rear gate 120 opening, as illustrated.

Figure 5A:
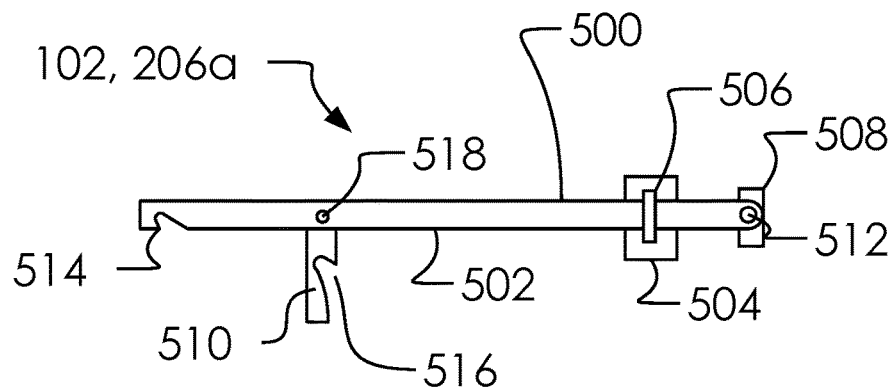
FIG. 5A illustrates an elevated front side view of closed configuration 206*a*.

FIG. 5A illustrates an elevated front side view of closed configuration 206*a*.

Figure 5B:
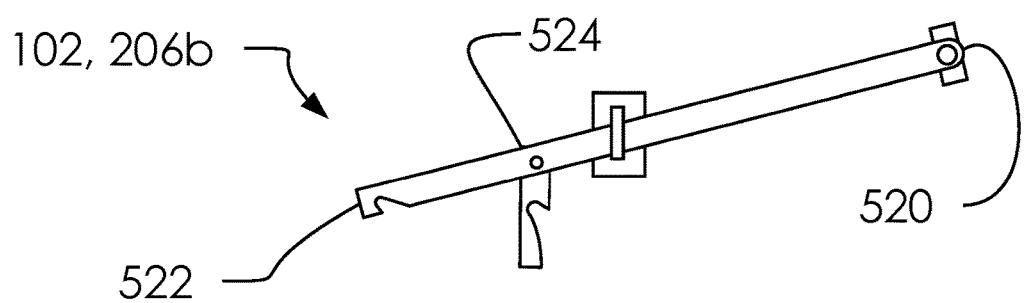
FIG. 5B illustrates an elevated front side view of second configuration 206*b*.

FIG. 5B illustrates an elevated front side view of second configuration 206*b*.

Figure 5C:
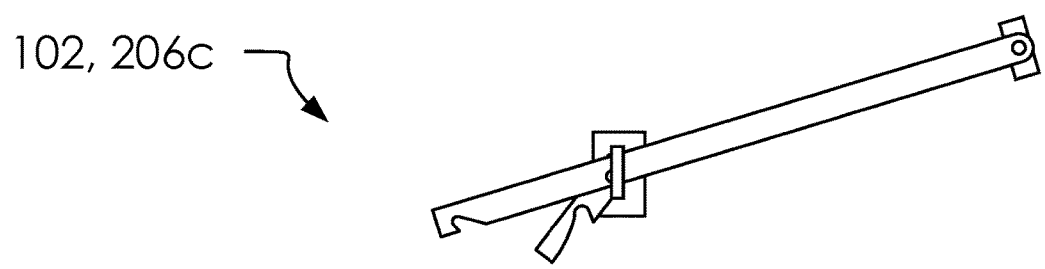
FIG. 5C illustrates an elevated front side view of third configuration 206*c*.

FIG. 5C illustrates an elevated front side view of third configuration 206*c*.

In one embodiment, said side plates 502 can comprise said prop arm assembly 500, said first side plate 502*a*, said second side plate 502*b*, said distal hinge 512 and said proximal locking hook 514.

In one embodiment, said lock bar assembly 504 can comprise said lock bar 506.

In one embodiment, said rotating lock arm 510 can comprise said locking hook 516 and said locking hook hinge 518.

In one embodiment, said locking hook hinge 518 can comprise said locking hook hinge 518.

In one embodiment, said prop arm assembly 500 can comprise said side plates 502, said first end 520, said second end 522 and said mid-point 524.

In one embodiment, said door prop assembly 102 can comprise said side plates 502, said lock bar assembly 504, said distal mount assembly 508, said rotating lock arm 510, said distal hinge 512 and said proximal locking hook 514.

In one embodiment, said side plates 502 can selectively slide through said lock bar 506 of said lock bar assembly 504.

Said distal mount assembly 508 can attach to a portion of said rear gate 120. Said lock bar assembly 504 can attach to a portion of said tilting body 106.

Said rotating lock arm 510 can rotate freely on said locking hook hinge 518, and said side plates 502 at said distal hinge 512 can rotate freely relative to said distal mount assembly 508.

As illustrated in said third configuration 206*c*, said rotating lock arm 510 can rotate so as to slide through said lock bar 506 as said door prop assembly 102 transitions from said closed configuration 206*a* and said open and locked configuration 206*d*.

Figure 6A:
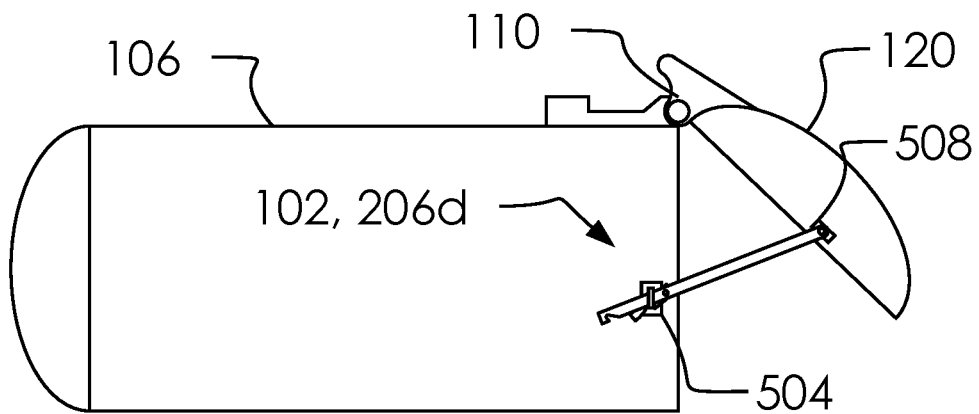
FIG. 6A illustrates an elevated front side view of open and locked configuration 206*d*.

FIG. 6A illustrates an elevated front side view of open and locked configuration 206*d*.

Figure 6B:
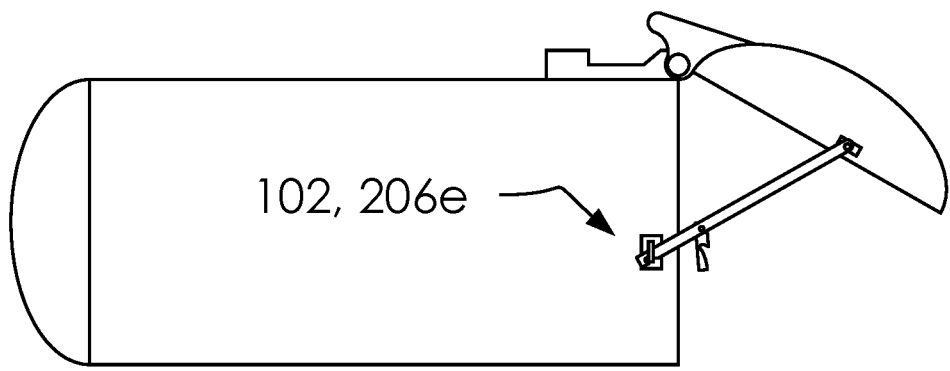
FIG. 6B illustrates an elevated front side view of fully extended configuration 206*e*.

FIG. 6B illustrates an elevated front side view of fully extended configuration 206*e*.

Figure 6C:
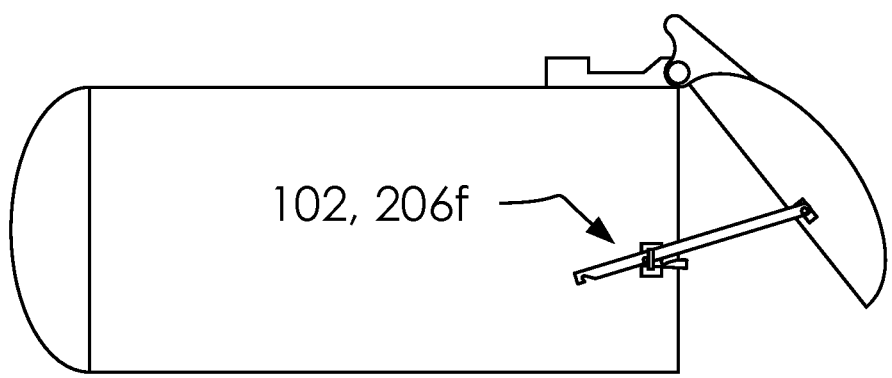
FIG. 6C illustrates an elevated front side view of sixth configuration 206*f*.

FIG. 6C illustrates an elevated front side view of sixth configuration 206*f*.

In one embodiment, said door prop assembly 102 can be transitioned back to said closed configuration 206*a* by: rotating said rear gate 120 still further from said tilting body 106 so as to pass the remaining portions of said rotating lock arm 510 through said lock bar 506; catching said proximal locking hook 514 on said lock bar 506 with said door prop assembly 102 at said fully extended configuration 206*e*; stopping rotation of said rear gate 120 with said proximal locking hook 514; reversing rotating direction; and pressing said rotating lock arm 510 through said lock bar 506 in the opposite direction until said rear gate 120 is closed and said door prop assembly 102 is in said closed configuration 206*a*.

Figure 7A:
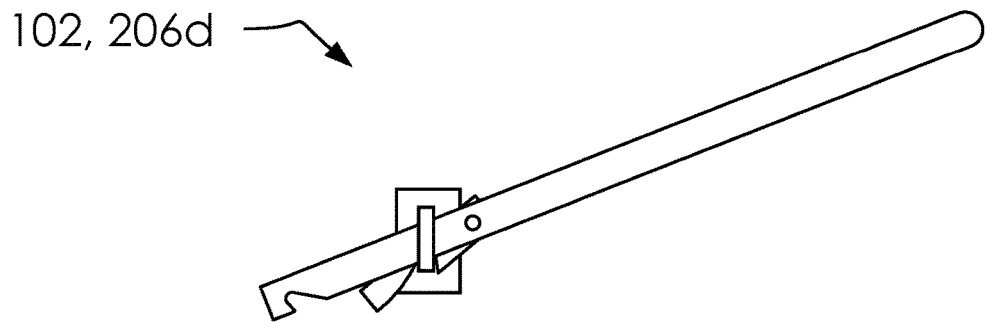
FIG. 7A illustrates an elevated front side view of open and locked configuration 206*d*.

FIG. 7A illustrates an elevated front side view of open and locked configuration 206*d*.

Figure 7B:
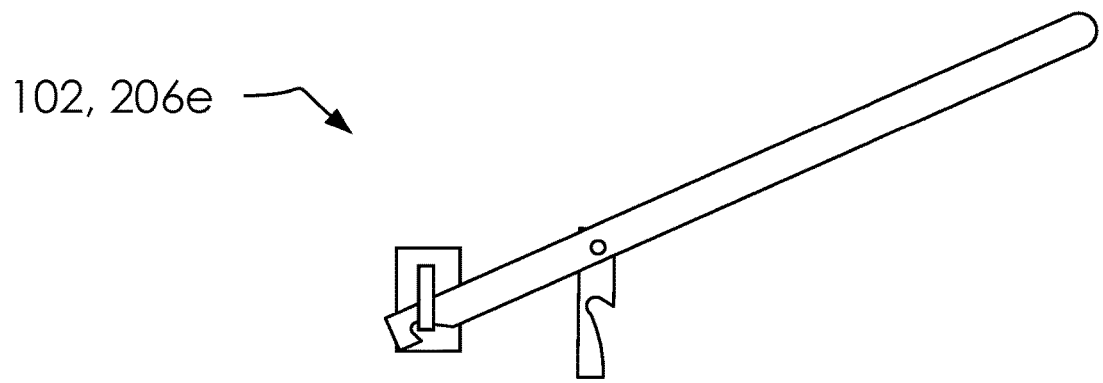
FIG. 7B illustrates an elevated front side view of fully extended configuration 206*e*.

FIG. 7B illustrates an elevated front side view of fully extended configuration 206*e*.

Figure 7C:
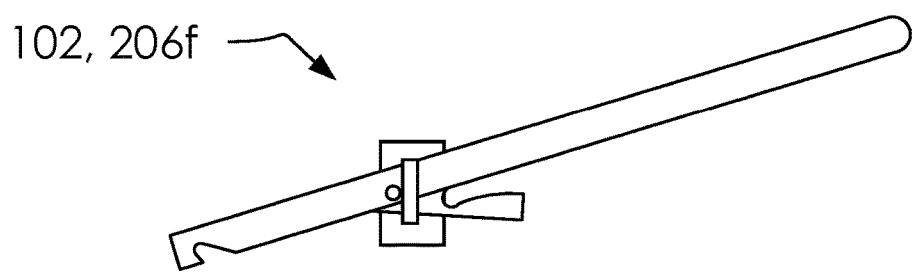
FIG. 7C illustrates an elevated front side view of sixth configuration 206*f*.

FIG. 7C illustrates an elevated front side view of sixth configuration 206*f*.

Figure 8:
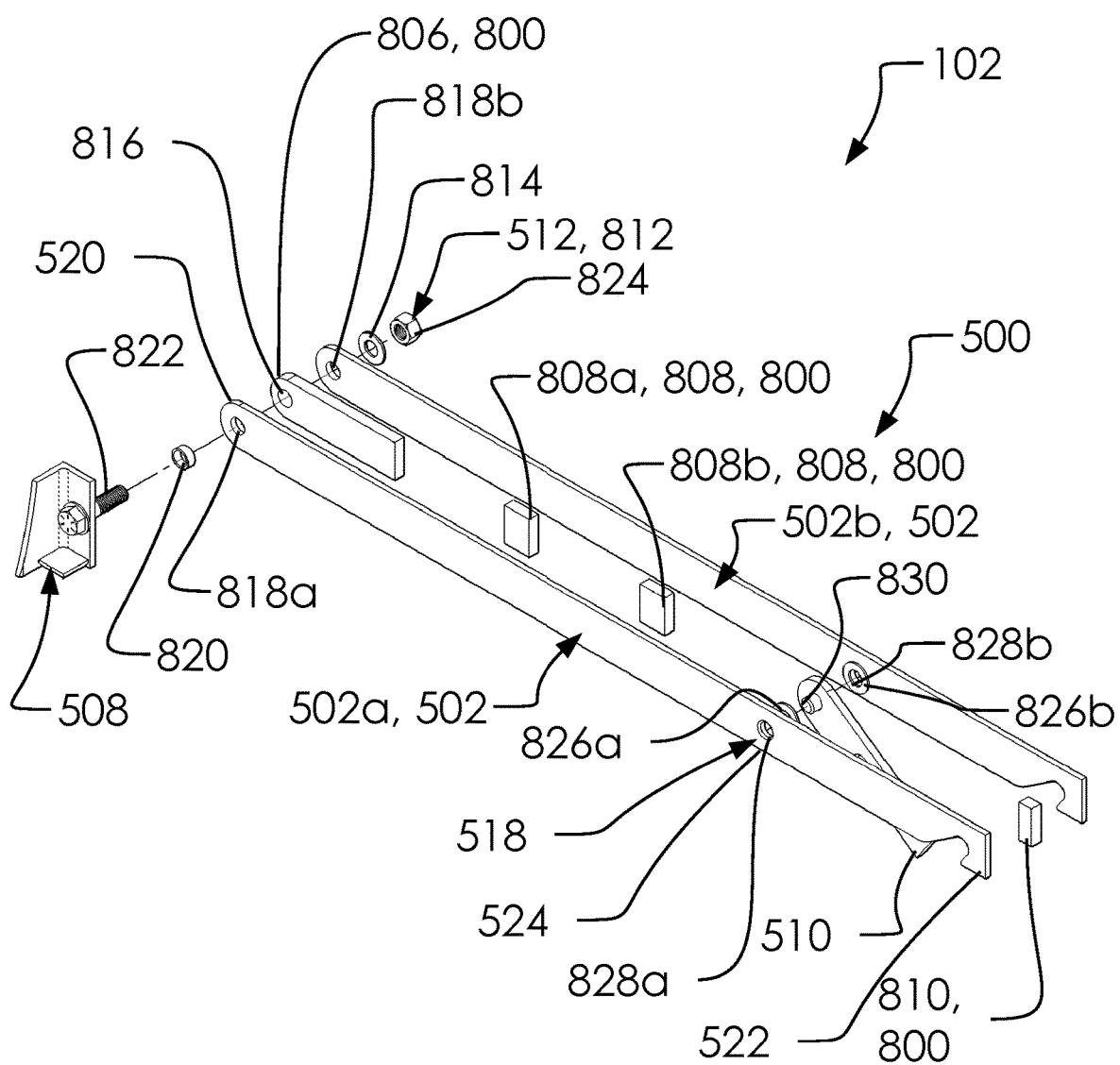
FIG. 8 illustrates a perspective exploded overview view of door prop assembly 102.

FIG. 8 illustrates a perspective exploded overview view of door prop assembly 102.

In one embodiment, said mounting bracket assembly 802 can comprise said nut and bolt assembly 812.

In one embodiment, said center spacers 808 can comprise said first center spacer 808*a* and said second center spacer 808*b*.

In one embodiment, said nut and bolt assembly 812 can comprise said washer 814, said spacer eye 816, said spacer eye 816, said proximate plate eyes 818, said pipe 820, said bolt 822 and said nut 824.

In one embodiment, said proximate plate eyes 818 can comprise said first proximate plate eye 818*a* and said second proximate plate eye 818*b*.

In one embodiment, said washers 826 can comprise said first washer 826*a* and said second washer 826*b*.

In one embodiment, said hook hinge eyes 828 can comprise said first hook hinge eye 828*a* and said second hook hinge eye 828*b*.

In one embodiment, said spacers 800 can comprise said proximal spacer 806, said center spacers 808 and said distal spacer 810.

In one embodiment, said door prop assembly 102 can comprise said mounting bracket assembly 802, said proximal spacer 806, said proximal spacer 806, said center spacers 808 and said distal spacer 810.

In one embodiment, said distal mount assembly 508 can comprise said nut and bolt assembly 812.

In one embodiment, said distal hinge 512 can comprise said nut and bolt assembly 812.

In one embodiment, said locking hook hinge 518 can comprise said washers 826, said second washer 826*b*, said hook hinge eyes 828 and said round bar 830.

In one embodiment, said prop arm assembly 500 can comprise said spacers 800, said proximal spacer 806, said center spacers 808 and said distal spacer 810.

In one embodiment, said prop arm assembly 500 can be a formed form one piece of metal to form the cross-sectional shape of said side plates 502. However, as illustrated, said prop arm assembly 500 can take on complexity so as to provide additional functionality.

In one embodiment, said prop arm assembly 500 can comprise a plurality of components comprising said side plates 502 (first side plate 502*a*, second side plate 502*b*), said center spacers 808 (first center spacer 808*a*, second center spacer 808*b*), proximal spacer 806, and distal spacer 810; wherein, said proximal spacer 806, center spacers 808 portions of rotating lock arm 510, and said distal spacer 810 can be pressed between said first side plate 502*a* and said second side plate 502*b*.

In one embodiment, portions of said prop arm assembly 500 can be welded to one another. For example, in one embodiment, said 805/can be welded between said side plates 502 at said first end 520; said center spacers 808 can be welded between said side plates 502 between said first end 520 and said mid-point 524 of said prop arm assembly 500; and said distal spacer 810 can be welded between said side plates 502 proximate to said second end 522. In one embodiment, said proximal spacer 806, said center spacers 808 and said distal spacer 810 can comprise spacers to provide a space for said rotating lock arm 510 to rotate between said side plates 502.

In one embodiment, said rotating lock arm 510 can be configured to selectively rotate said locking hook hinge 518 by rotating on said round bar 830 between said first hook hinge eye 828*a* and said second hook hinge eye 828*b* at said mid-point 524.

In one embodiment, said proximate plate eyes 818 of said side plates 502 and said spacer eye 816 of said proximal spacer 806 can align to allow a portion of said bolt 822 to pass through and create said distal hinge 512 at said first end 520. Further, said pipe 820, bolt 822, and nut 824 can rotate within said proximate plate eyes 818 and said spacer eye 816, as illustrated.

In one embodiment, said distal mount assembly 508 can attach to said rear gate 120 so as to allow said prop arm assembly 500 and said rear gate 120 to rotate relative to one another on said distal hinge 512.

In one embodiment, said rotating lock arm 510 can rotate relative to said prop arm assembly 500 on said locking hook hinge 518.

Figure 9A:
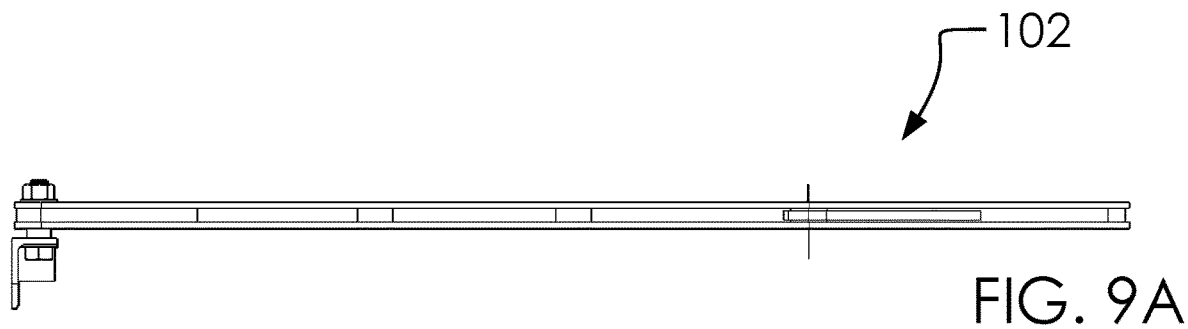
FIG. 9A illustrates an elevated top side view of door prop assembly 102.

FIG. 9A illustrates an elevated top side view of door prop assembly 102.

Figure 9B:
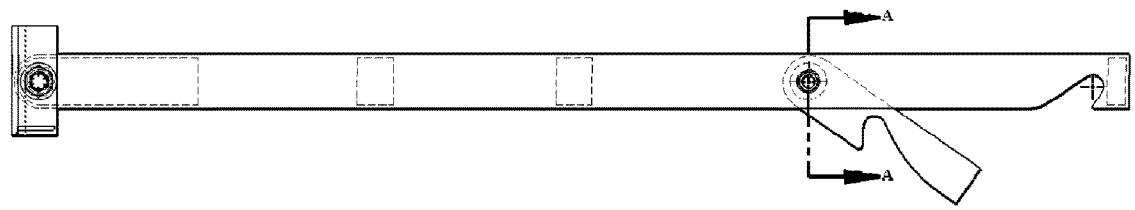
FIG. 9B illustrates an elevated front side view of door prop assembly 102.

FIG. 9B illustrates an elevated front side view of door prop assembly 102.

Figure 9C:
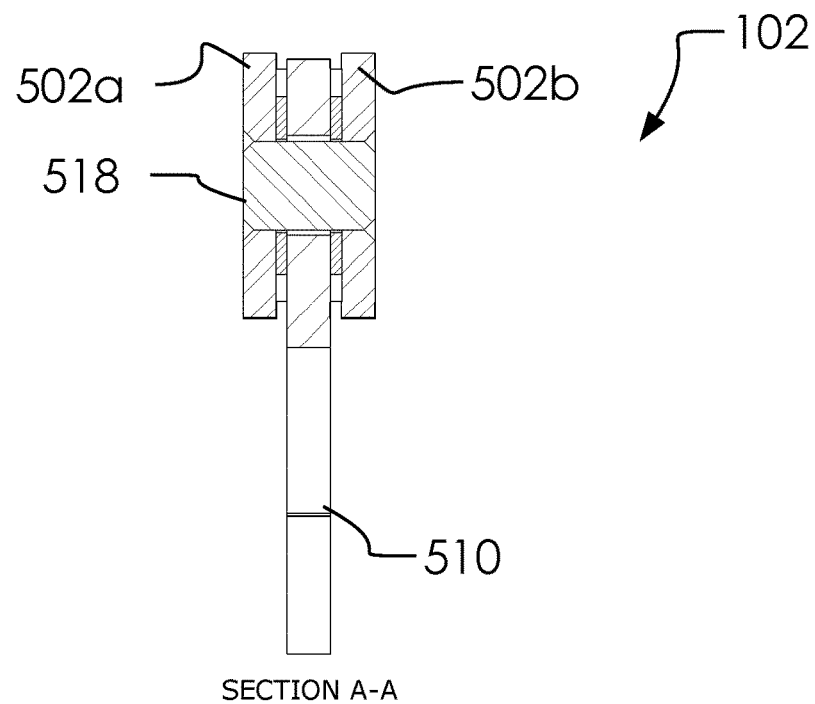
FIG. 9C illustrates an elevated cross-section side view of door prop assembly 102.

FIG. 9C illustrates an elevated cross-section side view of door prop assembly 102.

FIG. 10A illustrates a perspective overview view of lock bar 506.

FIG. 10B illustrates an elevated first side view of lock bar 506.

FIG. 10C illustrates an elevated front side view of lock bar 506.

In one embodiment, said lock bar 506 can comprise said lock bar eye 1002, said lower bar 1004, said upper bar 1006, said distal bar 1008 and said proximate bar 1010.

In one embodiment, said lock bar eye 1002 can comprise a space between distal bar 1008, said proximate bar 1010 and portions of said upper bar 1006 and said lower bar 1004. In one embodiment, said lock bar eye 1002 can comprise a space for allowing portions of prop arm assembly 500 and rotating lock arm 510 to selectively pass through, as discussed below. Said lock bar eye 1002 comprises a width 1018, and a height 1016. Said lock bar 506 comprises a length.

In one embodiment, said lock bar assembly 504 can attach to a side portion of said tilting body 106 and extend out so as to handle portions of said prop arm assembly 500, as illustrated herein.

FIG. 11A illustrates an elevated first side view of side plates 502.

FIG. 11B illustrates an elevated front side view of side plates 502.

FIG. 11C illustrates an elevated first side view of rotating lock arm 510.

FIG. 11D illustrates an elevated front side view of rotating lock arm 510.

FIG. 11E illustrates an elevated first side view of proximal spacer 806.

FIG. 11F illustrates an elevated front side view of proximal spacer 806.

In one embodiment, said side plates 502 can comprise said length 1102 and said width 1104.

In one embodiment, said rotating lock arm 510 can comprise said length 1106, said width 1108 and said lock arm eye 1114.

In one embodiment, said proximal spacer 806 can comprise said length 1110 and said width 1112.

In one embodiment, said prop arm assembly 500 can comprise width 1104 being substantially identical with width 1104 of side plates 502.

In one embodiment, width 1104, width 1108 and width 1112 can be substantially identical with one another. Accordingly, with said side plates 502 and said spacers 800 attached to one another, said prop arm assembly 500 can comprise a uniform thickness being approximately said width 1104.

In one embodiment, said width 1104 of prop arm assembly 500 can be less than 1016/of lock bar eye 1002 to allow movement of said prop arm assembly 500 through said lock bar eye 1002.

Figure 12A:
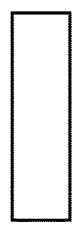
FIG. 12A illustrates an elevated first side view of center spacers 808.

FIG. 12A illustrates an elevated first side view of center spacers 808.

Figure 12B:
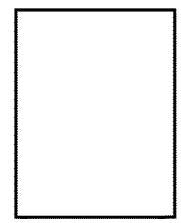
FIG. 12B illustrates an elevated front side view of center spacers 808.

FIG. 12B illustrates an elevated front side view of center spacers 808.

Figure 12C:
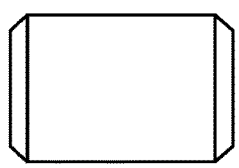
FIG. 12C illustrates an elevated first side view of round bar 830.

FIG. 12C illustrates an elevated first side view of round bar 830.

Figure 12D:
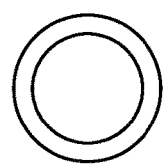
FIG. 12D illustrates an elevated front side view of round bar 830.

FIG. 12D illustrates an elevated front side view of round bar 830.

Figure 12E:
FIG. 12E illustrates an elevated first side view of distal spacer 810.

FIG. 12E illustrates an elevated first side view of distal spacer 810.

Figure 12F:
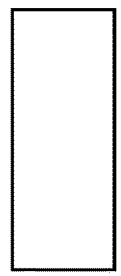
FIG. 12F illustrates an elevated front side view of distal spacer 810.

FIG. 12F illustrates an elevated front side view of distal spacer 810.

Figure 12G:
FIG. 12G illustrates an elevated first side view of support plate 1200.

FIG. 12G illustrates an elevated first side view of support plate 1200.

Figure 12H:
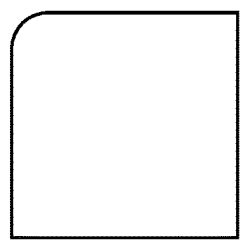
FIG. 12H illustrates an elevated front side view of support plate 1200.

FIG. 12H illustrates an elevated front side view of support plate 1200.

In one embodiment, said distal mount assembly 508 can comprise said support plate 1200.

In one embodiment, said mounting bracket assembly 802 can comprise said support plate 1200.

Figure 13:
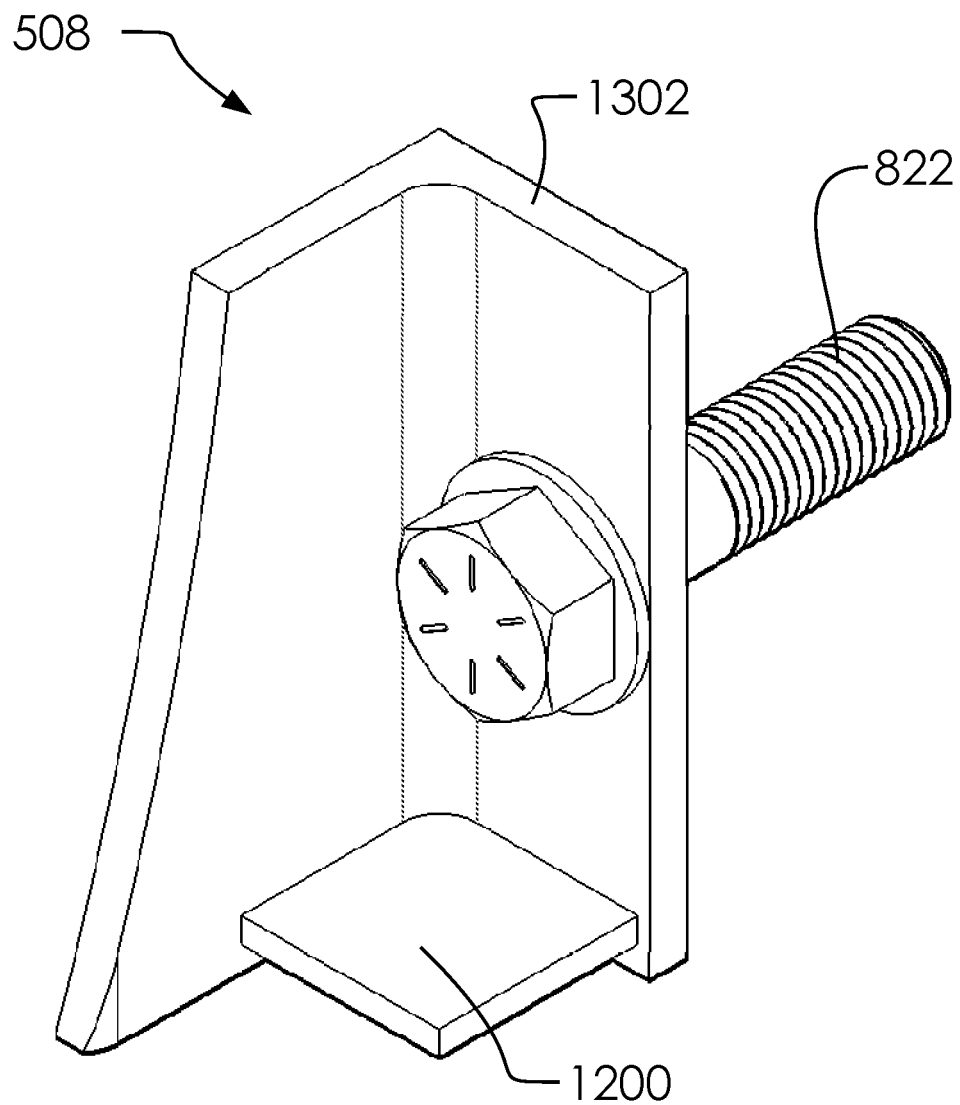
FIG. 13 illustrates an elevated overview view of distal mount assembly 508.

FIG. 13 illustrates an elevated overview view of distal mount assembly 508.

In one embodiment, said distal mount assembly 508 can comprise said L-bracket 1302.

In one embodiment, said mounting bracket assembly 802 can comprise said L-bracket 1302.

In one embodiment, said distal mount assembly 508 can attach to said rear gate 120, as discussed above.

In one embodiment, said L-bracket 1302 can provide two faces with one attached to rear gate 120 and another providing a substantially perpendicular face for receiving a portion of bolt 822.

In one embodiment, said support plate 1200 can reinforce and support said two faces of said L-bracket 1302.

In one embodiment, said support plate 1200 can be welded into said L-bracket 1302, as illustrated.

Figure 14A:
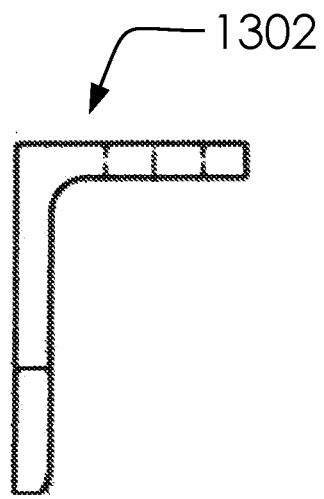
FIG. 14A illustrates an elevated top side view of L-bracket 1302.

FIG. 14A illustrates an elevated top side view of L-bracket 1302.

Figure 14B:
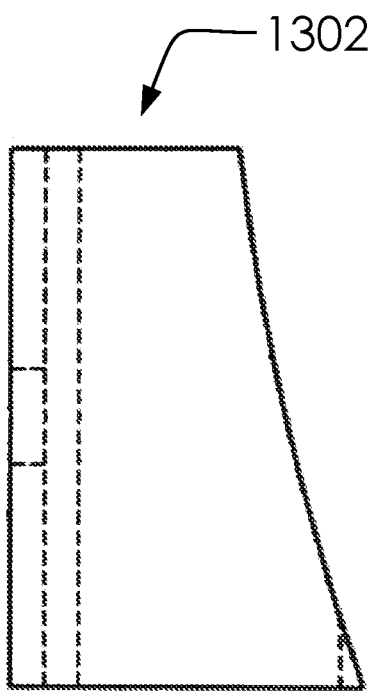
FIG. 14B illustrates an elevated front side view of L-bracket 1302.

FIG. 14B illustrates an elevated front side view of L-bracket 1302.

Figure 14C:
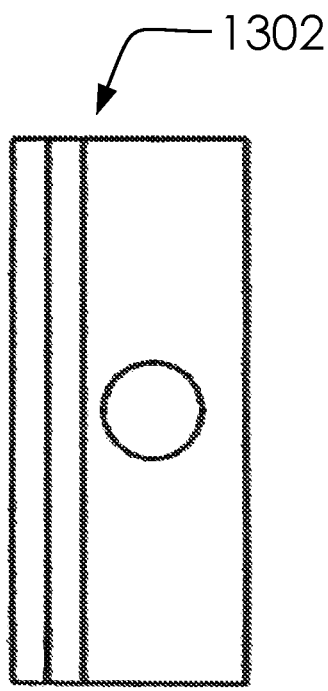
FIG. 14C illustrates an elevated first side view of L-bracket 1302.

FIG. 14C illustrates an elevated first side view of L-bracket 1302

The following sentences are included for completeness of this disclosure with reference to the claims.

A door prop assembly 102 for selectively supporting a rear gate 120 of a tilting vehicle 124. Said door prop assembly 102 is configured to selectively prop said rear gate 120 in an open configuration and safely release said rear gate 120 to transition to a closed configuration. Said door prop assembly 102 comprises a prop arm assembly 500, a lock bar assembly 504, a distal mount assembly 508, and a rotating lock arm 510. Said distal mount assembly 508 is attached to a side portion of said rear gate 120. Said lock bar assembly 504 is attached to a side portion of a tilting body 106. Said prop arm assembly 500 comprises a substantially straight element being adapted to slide through portions of a lock bar 506 of said lock bar assembly 504. Said rotating lock arm 510 is configured to rotate freely on a locking hook hinge 518. A side plates 502 at a distal hinge 512 is configured to rotate freely relative to said distal mount assembly 508. Said rotating lock arm 510 can rotate so as to slide through said lock bar 506 as said door prop assembly 102 transitions from a closed configuration 206*a* and an open and locked configuration 206*d*. Said door prop assembly 102 is configured to rotate be transitioned back to said closed configuration 206*a* by rotating said rear gate 120 still further from said tilting body 106 so as to pass the remaining portions of said rotating lock arm 510 through said lock bar 506, catching a proximal locking hook 514 on said lock bar 506 with said door prop assembly 102 at a fully extended configuration 206*e*. Stopping rotation of said rear gate 120 with said proximal locking hook 514, reversing rotating direction, and pressing said rotating lock arm 510 through said lock bar 506 in the opposite direction until said rear gate 120 is closed and said door prop assembly 102 is in said closed configuration 206*a*.

Said door prop assembly 102 comprises said lock bar assembly 504 attached to a side portion of said door prop assembly 102. Said lock bar assembly 504 comprises said lock bar 506 extending out to selectively handle portions of said prop arm assembly 500. Said lock bar 506 comprises a lock bar eye 1002, a lower bar 1004, an upper bar 1006, a distal bar 1008, and a proximate bar 1010. Said lock bar eye 1002 comprises a space between said distal bar 1008, said proximate bar 1010 and portions of said upper bar 1006 and said lower bar 1004. Said lock bar eye 1002 comprises a space for allowing portions of said prop arm assembly 500 and said rotating lock arm 510 to selectively pass through. A portion of said rotating lock arm 510 is configured to hook onto said lower bar 1004. A width 1104 of said prop arm assembly 500 is less than 1016/of said lock bar eye 1002 to allow movement of said prop arm assembly 500 through said lock bar eye 1002.

Said prop arm assembly 500 comprises said side plates 502 and a spacers 800. Said side plates 502 comprises a first side plate 502*a*, and a second side plate 502*b*. Said spacers 800 are configured to be pressed between said side plates 502 and provide a space for said rotating lock arm 510. Said prop arm assembly 500 comprises a first end 520, a second end 522 and a mid-point 524. Said prop arm assembly 500 is rotateably attached to said rear gate 120 with said distal mount assembly 508 and selectively rotate on said distal hinge 512. Said distal hinge 512 is at said first end 520 of said prop arm assembly 500. Said rotating lock arm 510 is rotateably attached to said prop arm assembly 500 and selectively rotates on said locking hook hinge 518. Said locking hook hinge 518 is at said mid-point 524 of said prop arm assembly 500. Said distal mount assembly 508 attaches to said rear gate 120 so as to allow said prop arm assembly 500 and said rear gate 120 to rotate relative to one another on said distal hinge 512. Said rotating lock arm 510 selectively rotates relative to said prop arm assembly 500 on said locking hook hinge 518.

Portions of said prop arm assembly 500 are welded to one another. Said spacers 800 are welded between said side plates 502.

Said spacers 800 comprises a center spacers 808, a proximal spacer 806, and a distal spacer 810. Said proximal spacer 806, said center spacers 808 portions of said rotating lock arm 510, and said distal spacer 810 can be pressed between said first side plate 502*a* and said second side plate 502*b*.

A center spacers 808 comprises a first center spacer 808*a*, and a second center spacer 808*b*.

A spacer eye 816 is welded between said side plates 502 at said first end 520. A center spacers 808 is welded between said side plates 502 between said first end 520 and said mid-point 524 of said prop arm assembly 500. A distal spacer 810 is welded between said side plates 502 proximate to said second end 522.

Said prop arm assembly 500 is formed form one piece of metal. Said prop arm assembly 500 comprises a first end 520, a second end 522 and a mid-point 524. Said prop arm assembly 500 is rotateably attached to said rear gate 120 and selectively rotate on said distal hinge 512. Said distal hinge 512 is at said first end 520 of said prop arm assembly 500. Said rotating lock arm 510 is rotateably attached to said prop arm assembly 500 and selectively rotates on said locking hook hinge 518. Said locking hook hinge 518 is at said mid-point 524 of said prop arm assembly 500. A door prop assembly 102 for selectively supporting a rear gate 120 of a tilting vehicle 124.

Said door prop assembly 102 is configured to selectively prop said rear gate 120 in an open configuration and safely release said rear gate 120 to transition to a closed configuration. Said door prop assembly 102 comprises a prop arm assembly 500, a lock bar assembly 504, a distal mount assembly 508, and a rotating lock arm 510. Said distal mount assembly 508 is attached to a side portion of said rear gate 120. Said tilting vehicle 124 comprises a trailer platform 104, a tilting body 106, a door hinge 110. Said tilting body 106 being rotateably attached to said trailer platform 104. Said tilting body 106 comprises said rear gate 120. Said rear gate 120 is rotateably attached to said tilting body 106 with said door hinge 110. Said lock bar assembly 504 is attached to a side portion of said tilting body 106. Said prop arm assembly 500 comprises a substantially straight element being adapted to slide through portions of a lock bar 506 of said lock bar assembly 504. Said rotating lock arm 510 is configured to rotate freely on a locking hook hinge 518. A side plates 502 at a distal hinge 512 is configured to rotate freely relative to said distal mount assembly 508. Said door prop assembly 102 is configured to transition through a plurality of configurations 206 with a closed configuration 206*a* being closed and an open and locked configuration 206*d* being engaged to support said rear gate 120.

Said rotating lock arm 510 can rotate so as to slide through said lock bar 506 as said door prop assembly 102 transitions from said closed configuration 206*a* and said open and locked configuration 206*d*. Said door prop assembly 102 is configured to rotate be transitioned back to said closed configuration 206*a* by rotating said rear gate 120 still further from said tilting body 106 so as to pass the remaining portions of said rotating lock arm 510 through said lock bar 506, catching a proximal locking hook 514 on said lock bar 506 with said door prop assembly 102 at a fully extended configuration 206*e*. Stopping rotation of said rear gate 120 with said proximal locking hook 514, reversing rotating direction, and pressing said rotating lock arm 510 through said lock bar 506 in the opposite direction until said rear gate 120 is closed and said door prop assembly 102 is in said closed configuration 206a. A door prop assembly 102 for selectively supporting a rear gate 120 of a tilting vehicle 124.

Said door prop assembly 102 is configured to selectively prop said rear gate 120 in an open configuration and safely release said rear gate 120 to transition to a closed configuration. Said door prop assembly 102 comprises a prop arm assembly 500, a lock bar assembly 504, a distal mount assembly 508, and a rotating lock arm 510. Said distal mount assembly 508 is attached to a side portion of said rear gate 120. Said tilting vehicle 124 comprises a trailer platform 104, a tilting body 106, a door hinge 110. Said tilting body 106 being rotateably attached to said trailer platform 104. Said tilting body 106 comprises said rear gate 120. Said rear gate 120 is rotateably attached to said tilting body 106 with said door hinge 110. Said lock bar assembly 504 is attached to a side portion of said tilting body 106. Said prop arm assembly 500 comprises a substantially straight element being adapted to slide through portions of a lock bar 506 of said lock bar assembly 504. Said rotating lock arm 510 is configured to rotate freely on a locking hook hinge 518. A side plates 502 at a distal hinge 512 is configured to rotate freely relative to said distal mount assembly 508. Said door prop assembly 102 is configured to transition through a plurality of configurations 206 with a closed configuration 206a being closed and an open and locked configuration 206d being engaged to support said rear gate 120. Said prop arm assembly 500 comprises said side plates 502 and a spacers 800. Said side plates 502 comprises a first side plate 502a, and a second side plate 502b. Said spacers 800 are configured to be pressed between said side plates 502 and provide a space for said rotating lock arm 510. Said prop arm assembly 500 comprises a first end 520, a second end 522 and a mid-point 524. Said prop arm assembly 500 is rotateably attached to said rear gate 120 with said distal mount assembly 508 and selectively rotate on said distal hinge 512. Said distal hinge 512 is at said first end 520 of said prop arm assembly 500. Said rotating lock arm 510 is rotateably attached to said prop arm assembly 500 and selectively rotates on said locking hook hinge 518. Said locking hook hinge 518 is at said mid-point 524 of said prop arm assembly 500. Said distal mount assembly 508 attaches to said rear gate 120 so as to allow said prop arm assembly 500 and said rear gate 120 to rotate relative to one another on said distal hinge 512. Said rotating lock arm 510 selectively rotates relative to said prop arm assembly 500 on said locking hook hinge 518. A spacer eye 816 is welded between said side plates 502 at said first end 520. A center spacers 808 is welded between said side plates 502 between said first end 520 and said mid-point 524 of said prop arm assembly 500. A distal spacer 810 is welded between said side plates 502 proximate to said second end 522. Said center spacers 808 comprises a first center spacer 808a, and a second center spacer 808b. Said spacers 800 comprises said center spacers 808, a proximal spacer 806, and said distal spacer 810. Said proximal spacer 806, said center spacers 808 portions of said rotating lock arm 510, and said distal spacer 810 can be pressed between said first side plate 502a and said second side plate 502b.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A door prop assembly for selectively supporting a rear gate of a tilting vehicle, wherein:
    said door prop assembly is configured to prop said rear gate in an open configuration and safely release said rear gate to transition to a closed configuration;
    said door prop assembly comprises a prop arm assembly, a lock bar assembly, a distal mount assembly, and a rotating lock arm;
    said distal mount assembly is attached to a side portion of said rear gate;
    said tilting vehicle comprises a trailer platform, a tilting body, a door hinge;
    said tilting body being rotateably attached to said trailer platform;
    said tilting body comprises said rear gate;
    said rear gate is rotateably attached to said tilting body with said door hinge;
    said lock bar assembly is attached to a side portion of a tilting body;
    said prop arm assembly comprises a substantially straight element being adapted to slide through portions of a lock bar of said lock bar assembly;
    said rotating lock arm is configured to rotate freely on a locking hook hinge;
    a side plates at a distal hinge is configured to rotate freely relative to said distal mount assembly;
    said door prop assembly is configured to transition through a plurality of configurations with a closed configuration being closed and an open and locked configuration being engaged to support said rear gate;
    said rotating lock arm can rotate so as to slide through said lock bar as said door prop assembly transitions from a closed configuration and an open and locked configuration; and
    said door prop assembly is configured to rotate be transitioned back to said closed configuration by
        rotating said rear gate still further from said tilting body so as to pass the remaining portions of said rotating lock arm through said lock bar,
        catching a proximal locking hook on said lock bar with said door prop assembly at a fully extended configuration; stopping rotation of said rear gate with said proximal locking hook,
        reversing rotating direction, and
        pressing said rotating lock arm through said lock bar in the opposite direction until said rear gate is closed and said door prop assembly is in said closed configuration.

2. The door prop assembly from claim 1, wherein:
    said door prop assembly comprises said lock bar assembly attached to a side portion of said door prop assembly;
    said lock bar assembly comprises said lock bar extending out to selectively handle portions of said prop arm assembly;
    said lock bar comprises a lock bar eye, a lower bar, an upper bar, a distal bar, and a proximate bar;

said lock bar eye comprises a space between said distal bar, said proximate bar and portions of said upper bar and said lower bar;

said lock bar eye comprises a space for allowing portions of said prop arm assembly and said rotating lock arm to selectively pass through;

a portion of said rotating lock arm is configured to hook onto said lower bar; and a width of said prop arm assembly is less than a height of said lock bar eye to allow movement of said prop arm assembly through said lock bar eye.

3. The door prop assembly from claim 1, wherein:

said prop arm assembly comprises said side plates and a spacers;

said side plates comprises a first side plate, and a second side plate;

said spacers are configured to be pressed between said side plates and provide a space for said rotating lock arm;

said prop arm assembly comprises a first end, a second end and a mid-point;

said prop arm assembly is rotateably attached to said rear gate with said distal mount assembly and selectively rotate on said distal hinge;

said distal hinge is at said first end of said prop arm assembly;

said rotating lock arm is rotateably attached to said prop arm assembly and selectively rotates on said locking hook hinge;

said locking hook hinge is at said mid-point of said prop arm assembly;

said distal mount assembly attaches to said rear gate so as to allow said prop arm assembly and said rear gate to rotate relative to one another on said distal hinge; and said rotating lock arm selectively rotates relative to said prop arm assembly on said locking hook hinge.

4. The door prop assembly from claim 3, wherein:

portions of said prop arm assembly are welded to one another; and said spacers are welded between said side plates.

5. The door prop assembly from claim 3, wherein:

said spacers comprises a center spacers, a proximal spacer, and a distal spacer; and said proximal spacer, and center spacers portions of said rotating lock arm, and said distal spacer can be pressed between said first side plate and said second side plate.

6. The door prop assembly from claim 3, wherein:

a center spacers comprises a first center spacer, and a second center spacer.

7. The door prop assembly from claim 3, wherein:

a spacer eye is welded between said side plates at said first end;

a center spacers is welded between said side plates between said first end and said mid-point of said prop arm assembly; and a distal spacer is welded between said side plates proximate to said second end.

8. The door prop assembly from claim 1, wherein:

said prop arm assembly is formed form one piece of metal;

said prop arm assembly comprises a first end, a second end and a mid-point;

said prop arm assembly is rotateably attached to said rear gate and selectively rotate on said distal hinge;

said distal hinge is at said first end of said prop arm assembly;

said rotating lock arm is rotateably attached to said prop arm assembly and selectively rotates on said locking hook hinge; and said locking hook hinge is at said mid-point of said prop arm assembly.

9. A door prop assembly for selectively supporting a rear gate of a tilting vehicle, wherein:

said door prop assembly is configured to prop said rear gate in an open configuration and safely release said rear gate to transition to a closed configuration;

said door prop assembly comprises a prop arm assembly, a lock bar assembly, a distal mount assembly, and a rotating lock arm;

said distal mount assembly is attached to a side portion of said rear gate;

said tilting vehicle comprises a trailer platform, a tilting body, a door hinge;

said tilting body being rotateably attached to said trailer platform;

said tilting body comprises said rear gate;

said rear gate is rotateably attached to said tilting body with said door hinge;

said lock bar assembly is attached to a side portion of said tilting body;

said prop arm assembly comprises a substantially straight element being adapted to slide through portions of a lock bar of said lock bar assembly;

said rotating lock arm is configured to rotate freely on a locking hook hinge;

a side plates at a distal hinge is configured to rotate freely relative to said distal mount assembly; and said door prop assembly is configured to transition through a plurality of configurations with a closed configuration being closed and an open and locked configuration being engaged to support said rear gate.

10. The door prop assembly from claim 9, wherein:

said rotating lock arm can rotate so as to slide through said lock bar as said door prop assembly transitions from said closed configuration and said open and locked configuration; and said door prop assembly is configured to rotate be transitioned back to said closed configuration by rotating said rear gate still further from said tilting body so as to pass the remaining portions of said rotating lock arm through said lock bar, catching a proximal locking hook on said lock bar with said door prop assembly at a fully extended configuration; stopping rotation of said rear gate with said proximal locking hook, reversing rotating direction, and pressing said rotating lock arm through said lock bar in the opposite direction until said rear gate is closed and said door prop assembly is in said closed configuration.

11. A door prop assembly for selectively supporting a rear gate of a tilting vehicle, wherein:

said door prop assembly is configured to prop said rear gate in an open configuration and safely release said rear gate to transition to a closed configuration;

said door prop assembly comprises a prop arm assembly, a lock bar assembly, a distal mount assembly, and a rotating lock arm;

said distal mount assembly is attached to a side portion of said rear gate;

said tilting vehicle comprises a trailer platform, a tilting body, a door hinge;

said tilting body being rotateably attached to said trailer platform;
said tilting body comprises said rear gate;
said rear gate is rotateably attached to said tilting body with said door hinge;
said lock bar assembly is attached to a side portion of said tilting body;
said prop arm assembly comprises a substantially straight element being adapted to slide through portions of a lock bar of said lock bar assembly;
said rotating lock arm is configured to rotate freely on a locking hook hinge;
a side plates at a distal hinge is configured to rotate freely relative to said distal mount assembly;
said door prop assembly is configured to transition through a plurality of configurations with a closed configuration being closed and an open and locked configuration being engaged to support said rear gate;
said prop arm assembly comprises said side plates and a spacers;
said side plates comprises a first side plate, and a second side plate;
said spacers are configured to be pressed between said side plates and provide a space for said rotating lock arm;
said prop arm assembly comprises a first end, a second end and a mid-point;
said prop arm assembly is rotateably attached to said rear gate with said distal mount assembly and selectively rotate on said distal hinge;
said distal hinge is at said first end of said prop arm assembly;
said rotating lock arm is rotateably attached to said prop arm assembly and selectively rotates on said locking hook hinge;
said locking hook hinge is at said mid-point of said prop arm assembly;
said distal mount assembly attaches to said rear gate so as to allow said prop arm assembly and said rear gate to rotate relative to one another on said distal hinge;
said rotating lock arm selectively rotates relative to said prop arm assembly on said locking hook hinge;
a spacer eye is welded between said side plates at said first end;
a center spacers is welded between said side plates between said first end and said mid-point of said prop arm assembly;
a distal spacer is welded between said side plates proximate to said second end;
said center spacers comprises a first center spacer, and a second center spacer;
said spacers comprises said center spacers, a proximal spacer, and said distal spacer; and
said proximal spacer, said center spacers portions of said rotating lock arm, and said distal spacer can be pressed between said first side plate and said second side plate.

12. The door prop assembly from claim 9, wherein:
said door prop assembly comprises said lock bar assembly attached to a side portion of said door prop assembly;
said lock bar assembly comprises said lock bar extending out to selectively handle portions of said prop arm assembly;
said lock bar comprises a lock bar eye, a lower bar, an upper bar, a distal bar, and a proximate bar;
said lock bar eye comprises a space between said distal bar, said proximate bar and portions of said upper bar and said lower bar;

said lock bar eye comprises a space for allowing portions of said prop arm assembly and said rotating lock arm to selectively pass through;
a portion of said rotating lock arm is configured to hook onto said lower bar; and
a width of said prop arm assembly is less than a height of said lock bar eye to allow movement of said prop arm assembly through said lock bar eye.

13. The door prop assembly from claim 9, wherein:
said prop arm assembly comprises said side plates and a spacers;
said side plates comprises a first side plate, and a second side plate;
said spacers are configured to be pressed between said side plates and provide a space for said rotating lock arm;
said prop arm assembly comprises a first end, a second end and a mid-point;
said prop arm assembly is rotateably attached to said rear gate with said distal mount assembly and selectively rotate on said distal hinge;
said distal hinge is at said first end of said prop arm assembly;
said rotating lock arm is rotateably attached to said prop arm assembly and selectively rotates on said locking hook hinge;
said locking hook hinge is at said mid-point of said prop arm assembly;
said distal mount assembly attaches to said rear gate so as to allow said prop arm assembly and said rear gate to rotate relative to one another on said distal hinge; and
said rotating lock arm selectively rotates relative to said prop arm assembly on said locking hook hinge.

14. The door prop assembly from claim 13, wherein:
portions of said prop arm assembly are welded to one another; and
said spacers are welded between said side plates.

15. The door prop assembly from claim 13, wherein:
said spacers comprises a center spacers, a proximal spacer, and a distal spacer; and
said proximal spacer, said center spacers portions of said rotating lock arm, and said distal spacer can be pressed between said first side plate and said second side plate.

16. The door prop assembly from claim 13, wherein:
a center spacers comprises a first center spacer, and a second center spacer.

17. The door prop assembly from claim 13, wherein:
a spacer eye is welded between said side plates at said first end;
a center spacers is welded between said side plates between said first end and said mid-point of said prop arm assembly; and
a distal spacer is welded between said side plates proximate to said second end.

18. The door prop assembly from claim 9, wherein:
said prop arm assembly is formed form one piece of metal;
said prop arm assembly comprises a first end, a second end and a mid-point;
said prop arm assembly is rotateably attached to said rear gate and selectively rotate on said distal hinge;
said distal hinge is at said first end of said prop arm assembly;
said rotating lock arm is rotateably attached to said prop arm assembly and selectively rotates on said locking hook hinge; and said locking hook hinge is at said mid-point of said prop arm assembly.

\* \* \* \* \*